United States Patent
Qian et al.

(10) Patent No.: US 11,646,959 B2
(45) Date of Patent: May 9, 2023

(54) ACTIVE ETHERNET CABLE WITH BROADCASTING AND MULTIPLEXING FOR DATA PATH REDUNDANCY

(71) Applicant: Credo Technology Group Limited, Grand Cayman (KY)

(72) Inventors: Haoli Qian, Fremont, CA (US); Calvin Xiong Fang, Palo Alto, CA (US); William Brennan, Los Altos, CA (US); Jeffrey Twombly, Los Altos, CA (US)

(73) Assignee: Credo Technology Group Limited, Grand Cayman (KY)

( * ) Notice: Subject to any disclaimer, the term of this patent is extended or adjusted under 35 U.S.C. 154(b) by 312 days.

(21) Appl. No.: 16/932,988

(22) Filed: Jul. 20, 2020

(65) Prior Publication Data
US 2022/0021603 A1 Jan. 20, 2022

(51) Int. Cl.
*H04L 12/707* (2013.01)
*H04L 12/26* (2006.01)
*H04L 45/00* (2022.01)
*H04L 45/24* (2022.01)
*H04L 43/16* (2022.01)
*H04L 43/0823* (2022.01)

(52) U.S. Cl.
CPC .......... *H04L 45/22* (2013.01); *H04L 43/0823* (2013.01); *H04L 43/16* (2013.01); *H04L 45/24* (2013.01)

(58) Field of Classification Search
CPC ..... H04L 45/22; H04L 45/24; H04L 43/0823; H04L 43/16
USPC ......................................................... 370/252
See application file for complete search history.

(56) References Cited

U.S. PATENT DOCUMENTS

| | | | |
|---|---|---|---|
| 6,259,699 B1 | 7/2001 | Opalka et al. | |
| 6,396,303 B1 | 5/2002 | Young | |
| 7,079,525 B1 | 7/2006 | Goldstein et al. | |
| 3,004,961 A1 | 8/2011 | Buchanan | |
| 8,004,961 B1 * | 8/2011 | Buchanan | H04L 49/357 370/216 |
| 9,106,570 B2 | 8/2015 | Masood | |

(Continued)

OTHER PUBLICATIONS

Physical Medium Dependent (PMD) sublayer and baseband medium, type 50GBASE-CR, 100GBASE-CR2, and 200GBASE-CR4, Draft Amendment to IEEE Std 802.3-2015, Feb. 3, 2017, pp. 184-215, 32 pgs.

(Continued)

*Primary Examiner* — Gbemileke J Onamuti
(74) *Attorney, Agent, or Firm* — Ramey LLP; Daniel J. Krueger

(57) ABSTRACT

Active Ethernet cables that provide data path redundancy. One illustrative cable embodiment includes a first connector connected to each of a second and third connectors, the first connector including a multiplexer that couples a data stream from a selectable one of the second and third connectors to an output of the first connector. One illustrative method embodiment includes: producing from an output of a first connector a data stream from a currently selected one of multiple redundant connectors; monitoring the data stream for a fault associated with the currently selected one of multiple redundant connectors; and responsive to detecting said fault, producing from the output of the first connector a data stream from a different selected one of the multiple redundant connectors.

25 Claims, 5 Drawing Sheets

(56) References Cited

U.S. PATENT DOCUMENTS

| | | | |
|---|---|---|---|
| 9,385,859 | B2 | 7/2016 | Kuan |
| 9,606,573 | B1 | 3/2017 | Ebeling |
| 10,212,260 | B2 | 2/2019 | Sun |
| 10,855,278 | B1 | 12/2020 | Sheredy |
| 2003/0002116 | A1 | 1/2003 | Hayashi |
| 2003/0026267 | A1* | 2/2003 | Oberman ............ H04L 49/351 370/400 |
| 2003/0131301 | A1* | 7/2003 | Shimono ............ H04L 25/14 714/707 |
| 2009/0245258 | A1 | 10/2009 | Tanaka |
| 2009/0310483 | A1* | 12/2009 | Okazaki ............ H04L 43/0811 370/228 |
| 2010/0329325 | A1 | 12/2010 | Mobin |
| 2013/0051222 | A1* | 2/2013 | Gavrilov ............ H04L 41/0668 370/225 |
| 2013/0073749 | A1 | 3/2013 | Tremblay |
| 2013/0083810 | A1* | 4/2013 | Ghiasi ............ H04J 3/047 370/535 |
| 2013/0343400 | A1 | 12/2013 | Lusted |
| 2014/0086264 | A1 | 3/2014 | Lusted |
| 2014/0146833 | A1 | 5/2014 | Lusted |
| 2015/0003505 | A1 | 1/2015 | Lusted |
| 2016/0037486 | A1 | 2/2016 | Wentzloff |
| 2016/0134394 | A1 | 5/2016 | Tiruvur |
| 2016/0323164 | A1 | 11/2016 | Cao |
| 2016/0337114 | A1 | 11/2016 | Baden |
| 2016/0337183 | A1 | 11/2016 | Cornett |
| 2017/0257308 | A1* | 9/2017 | Cropper ............ H04L 67/10 |
| 2017/0324657 | A1 | 11/2017 | Zhong |
| 2018/0041332 | A1 | 2/2018 | Yang |

OTHER PUBLICATIONS

Addressing the Power-Performance IC Design Conundrum: A Novel Clock Design Technique to Reduce Power and Increase Performance. Cyclos Semiconductor, Inc., (Jun. 1, 2012). Retrieved from http://www.cyclos-semi.com/pdfs/time_to_change_the_clocks.pdf.

Jayakumar, Nikhil, et al. "Design and Tuning of a Tree-Mesh Clock Distribution." Juniper Networks presentation International Symposium on Physical Design, Jul. 2013; www.ispd.cc/slides/2013/7_jayakumar.pdf.

Physical Coding Sublayer (PCS) for 64B/66B, type 50GBASE-R, Draft Amendment to IEEE Std 802.3-2015, Feb. 3, 2017, pp. 132-141, 10 pgs.

Semiconductor Intellectual Property Core Wikipedia. Mar. 9, 2019 https://en.wikipedia.org/w/index.php?title=Semiconductor_intellectual_property_core&oldid=886997081.

Information Technology—Open Systems Interconnection—Basic Reference Model: The Basic Model, 1994.

"Physical Medium Attachment (PMA) sublayer, Physical Medium Dependent (PMD) sublayer, and baseband medium, type 100GBASE-KP4," IEEE Standard for Ethernet, Section Six, pp. 481-519, 39 pgs.

Reed-Solomon Forward Error Correction (RS-FEC) sublayer for 50GBASE-R PHYs, Draft Amendment to IEEE Std 802.3-2015, Feb. 3, 2017, pp. 142-159, 18 pgs.

IEEE P802.3cd™/D3.3; "Draft Standard for Ethernet Amendment 3: Media Access Control Parameters for 50 Gb/s and Physical Layers and Management Parameters for 50 Gb/s, 100 Gb/s, and 200 Gb/s Operation" Jun. 5, 2018, The Institute of Electrical and Electronics Engineers, Inc.

U.S. Appl. No. 16/904,074 filed Jun. 17, 2020 and titled "Physical Layer Interface with Redundant Data Paths" by inventors Calvin Xiong Fang, Haoli Qian, and Ashwin Upadhya.

U.S. Appl. No. 16/793,746, filed Feb. 18, 2020 and titled "Parallel Channel Skew for Enhanced Error Correction" by inventors Junqing Sun and Haoli Qian.

* cited by examiner

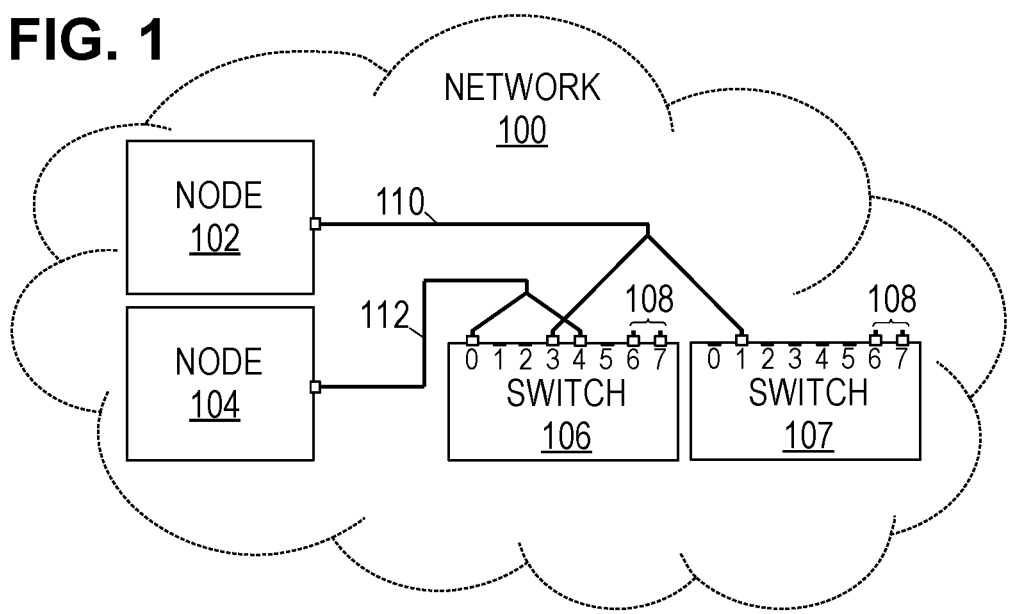
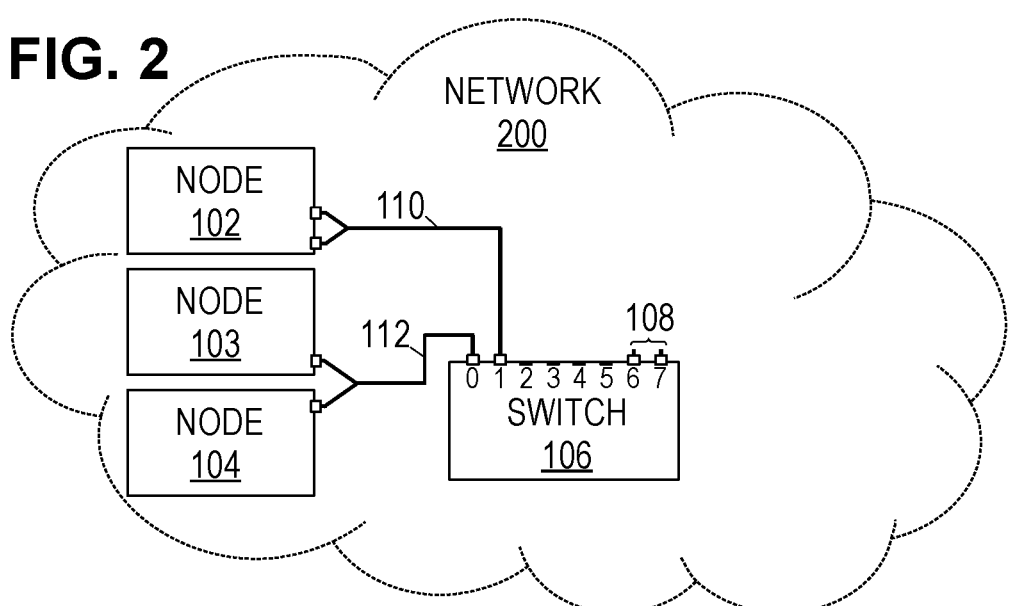

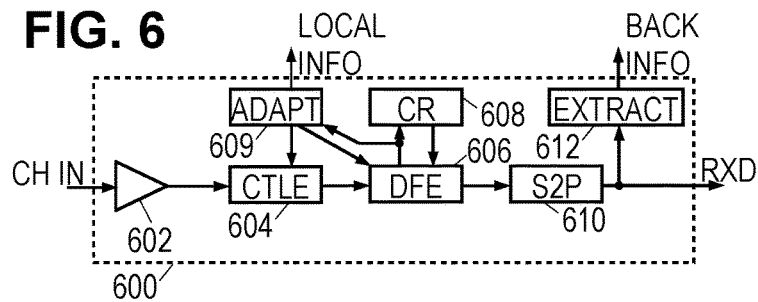
FIG. 6
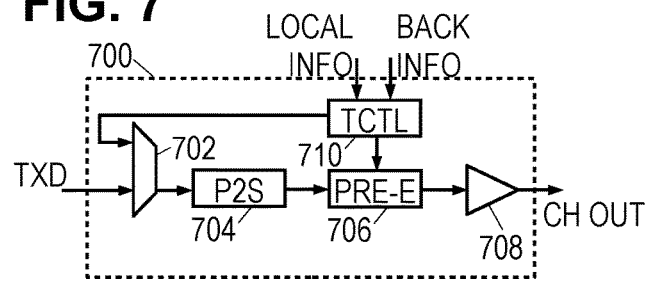
FIG. 7
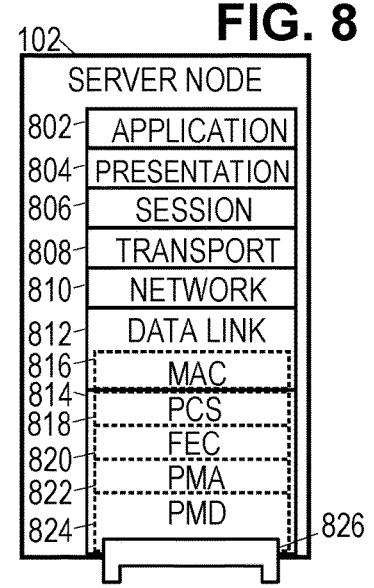
FIG. 8
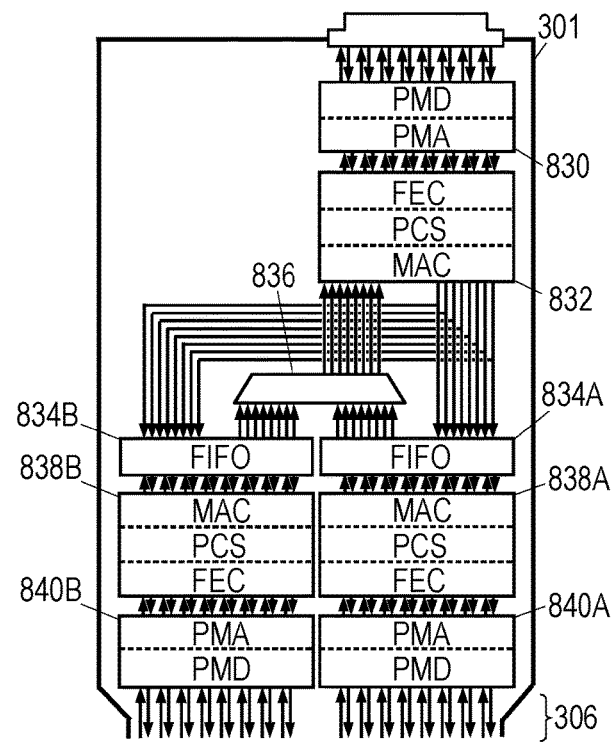

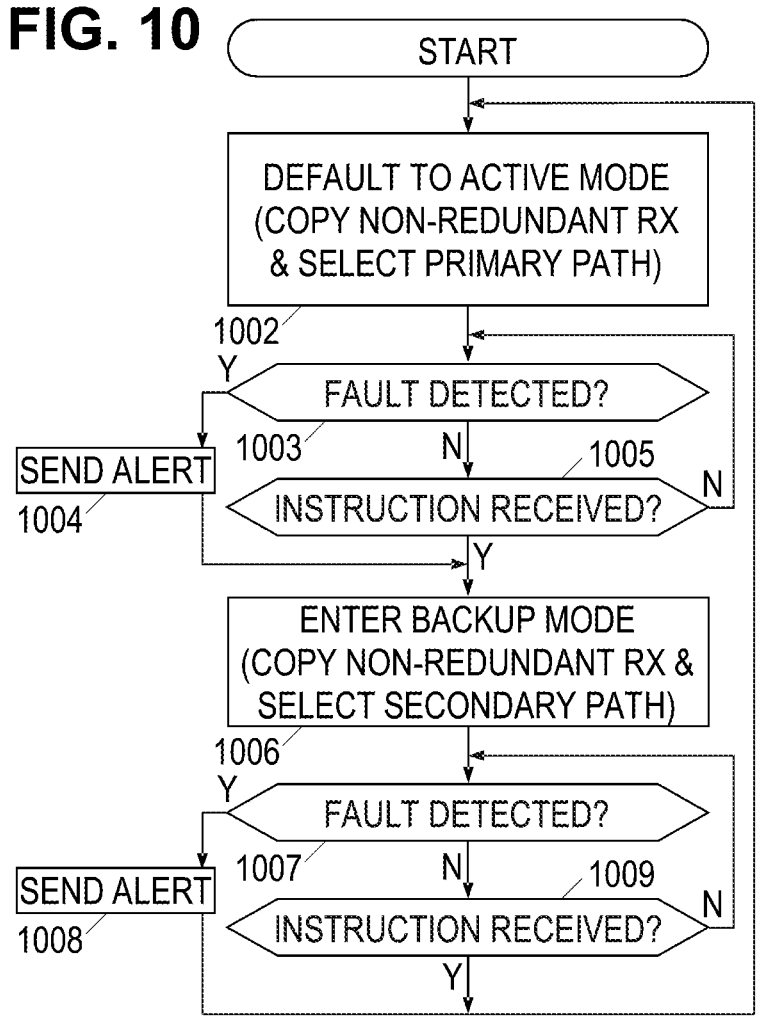

ACTIVE ETHERNET CABLE WITH BROADCASTING AND MULTIPLEXING FOR DATA PATH REDUNDANCY

CROSS-REFERENCE TO RELATED APPLICATIONS

The present application relates to co-pending U.S. application Ser. No. 16/904,074 filed Jun. 17, 2020 and titled "Physical Layer Interface with Redundant Data Paths" by inventors Calvin Xiong Fang, Haoli Qian, and Ashwin Upadhya, which is hereby incorporated herein by reference in its entirety. The present application further relates to co-pending U.S. application Ser. No. 16/793,746, filed Feb. 18, 2020 and titled "Parallel Channel Skew for Enhanced Error Correction" by inventors Junqing Sun and Haoli Qian, which is also hereby incorporated herein by reference in its entirety.

BACKGROUND

Data centers for cloud computing must run customer applications without interruption. However, both hardware and software components inevitably fail at a rate characterized by their mean time to failure. As the data center infrastructure gets more complex the aggregated failure rate rises quickly, and for hyperscale data centers the number of failures becomes difficult to handle.

One approach to this issue is to provide some form of redundancy that enables operations to continue even as failures are identified and repaired. When expressed in terms of hardware, the redundancy may take the form of an active component and an inactive, backup component that stands ready to take over if the active component should fail, thereby preventing a service interruption.

While such redundancies are beneficial, it would be inordinately expensive or inefficient to simply provide backups for every hardware component. Rather, it is desired to provide redundancy only where it is most beneficial to do so. Greater efficiencies may be achievable where it is possible to configure existing components to provide such redundancy without requiring duplication of the entire component.

SUMMARY

Accordingly, there are disclosed herein active Ethernet cables and communication methods that provide data path redundancy. In one illustrative cable embodiment, the cable includes a first connector connected to each of a second and third connectors, the first connector including a multiplexer that couples a data stream from a selectable one of the second and third connectors to an output of the first connector.

One illustrative communications method embodiment includes: producing from an output of a first connector a data stream from a currently selected one of multiple redundant connectors; monitoring the data stream for a fault associated with the currently selected one of multiple redundant connectors; and responsive to detecting said fault, producing from the output of the first connector a data stream from a different selected one of the multiple redundant connectors.

Also disclosed is a network embodiment including: a network node having a first network port; one or more switches providing second and third network ports; and a cable having first, second, and third connectors respectively coupled to the first, second, and third network ports, the cable configured to couple a data stream from a selectable one of the second and third connectors to the first network port.

An alternative communications method embodiment, includes: coupling a first network port of a network node to each of multiple switch ports with a cable having a first connector connecting to the first port and multiple redundant connectors connecting to the multiple switch ports; conveying a data stream from one of the multiple switch ports to the network node via a primary one of the multiple redundant connectors; and redirecting the data stream to the network node via a secondary one of the multiple redundant connectors.

Each of the foregoing embodiments may be implemented individually or conjointly and may be implemented with any one or more of the following optional features in any suitable combination: 1. redirecting includes detecting a fault associated with the primary one of the multiple redundant connectors. 2. detecting a fault includes comparing a bit error rate, a symbol error rate, or a packet loss rate, to a predetermined threshold. 3. broadcasting a return data stream from the network node to the switch to each of the multiple redundant connectors. 4. conveying and broadcasting each include error correction of the data streams, packet integrity checking, and regeneration of error correction code protection. 5. a controller that monitors for a fault associated with the second connector and provides a selection input to the multiplexer based at least in part on whether the fault is detected. 6. the first connector broadcasts a return data stream to each of the second and third connectors. 7. each of the data streams are retimed without error correction and regeneration of error correction code protection. 8. the first connector performs, for at least one of said data streams, error correction, packet integrity checking, and regeneration of error correction code protection. 9. a switch or network node to which one of the connectors is attached redirects the data stream.

BRIEF DESCRIPTION OF THE DRAWINGS

FIG. 1 shows a first illustrative network embodiment.
FIG. 2 shows a second illustrative network embodiment.
FIG. 6 is a block diagram of an illustrative deserializer module.
FIG. 7 is a block diagram of an illustrative serializer module.
FIG. 8 is a model diagram of an illustrative cable connector and network node.
FIG. 10 is a flow diagram of an illustrative reliability enhancement method.

DETAILED DESCRIPTION

Figure 3:
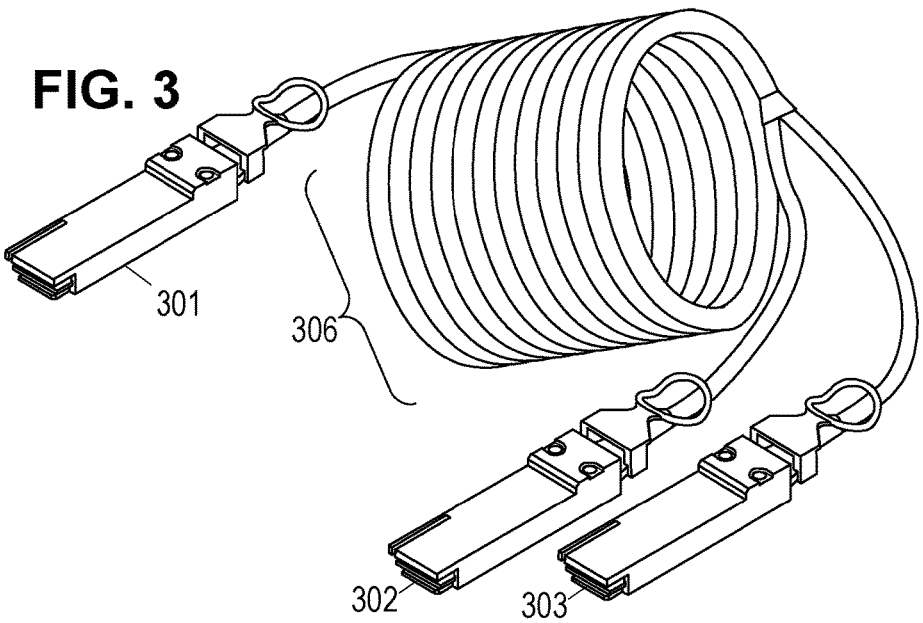
FIG. 3 is an isometric view of an illustrative cable embodiment.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

FIG. 1 shows an illustrative network 100, which includes two network nodes 102, 104, and two switches 106, 107. The network nodes 102, 104 each represent a device capable of sending and receiving communications via a network, such as a server, a storage device, a workstation, a phone, a printer, a scanner, a network hub, a network bridge, a switch, a router, or any device having a network port. The Ethernet Standard (IEEE Std 802.3-2015 or one of its updates) is used as an example herein, but any wired, optical, or cabled network standard would also be suitable.

Switches 106, 107 are each a device having multiple network ports and an internal mechanism for directing messages received on one of the network ports to another of the network ports. As used hereinafter, the term "switch" includes not just traditional network switches, but also routers and network bridges. It does not include a network hub, which only employs undirected forwarding from each port to all other ports. Frequently one or more of the switch ports 108 connect to other switches to enable communication between the nodes 102, 104 and a wider-area network such as the Internet.

An enhanced network cable 110 connects the network port of node 102 to two ports of switch 106. Similarly, cable 112 connects the network port of node 104 to a port of switch 106 and a port of switch 107. Unlike a conventional breakout cable, enhanced cables 110, 112 provide redundant connections to the switches, such that each cable connector can support the full data stream bandwidth. As described in further detail below, cable 110 couples the network node port to a selected one of the switch ports and, if a fault associated with the selected switch port is detected, cable 110 instead couples the network node port to the other connected switch port, maintaining connectivity even in the presence of such faults and providing an opportunity for the fault to be corrected without disrupting communication between network node 102 and switch 106. Cable 112 performs a similar function for node 104, preserving connectivity to the wider-area network if either one of the switches 106, 107, fails.

In situations where faults are statistically more likely with network nodes than with the network ports of switch 106, the enhanced cables 110, 112 may instead be oriented as shown in FIG. 2. In illustrative network 200, cable 110 couples one port of switch 106 to a selectable one of multiple network ports in node 102. Cable 112 couples another port of switch 106 to a selectable one of multiple network nodes 103, 104. When a fault is detected with a currently selected data path, the enhanced cable may automatically select the other available data path. Alternatively, one of the connected network devices may instruct the cable to transition to the other data path.

FIG. 3 shows an isometric view of an illustrative enhanced cable having a first, non-redundant connector 301 connected to a second and third redundant connectors 302, 303 by electrical, or optionally by optical, conductors 306.

Figure 4:
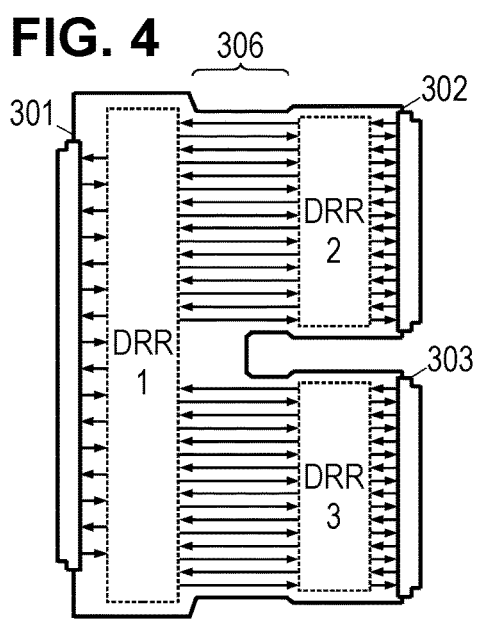
FIG. 4 is a block diagram of an illustrative cable embodiment.

FIG. 4 is a block diagram of one embodiment of the illustrative enhanced cable, in which each of the first, second, and third connectors 301, 302, 303 includes a data recovery and remodulation (DRR) device. DRR1 couples eight bidirectional data lanes from connector 301 to sixteen bidirectional data lanes as discussed in detail further below with reference to FIGS. 8-10. DRR2 and DRR3 are optional, but if included they each couple eight of the sixteen bidirectional data lanes to respective data lanes of connectors 302, 303.

The DRR devices may be implemented as integrated circuit devices that each mount to a small printed circuit board in the respective connector. The printed circuit board electrically couples the DRR device contacts to the cable conductors 306 and to the contacts of the network port connectors.

Figure 5:
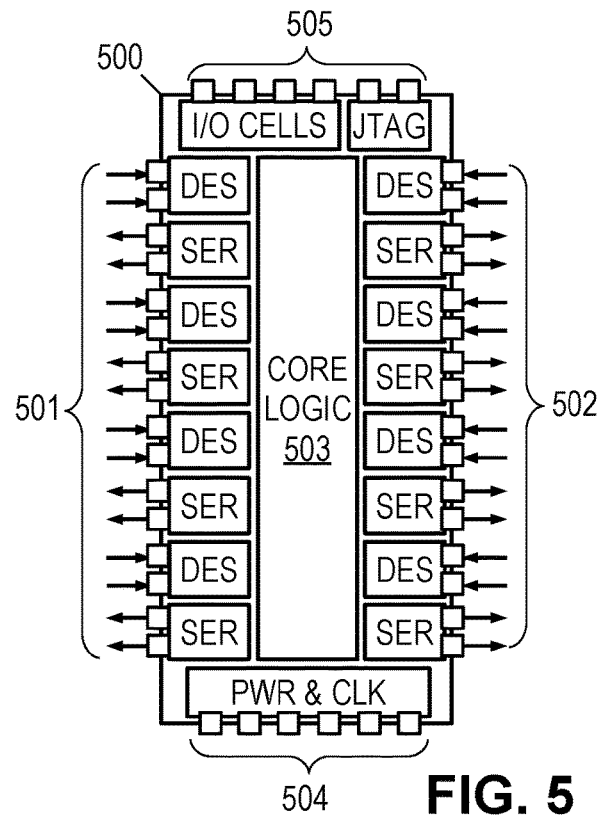
FIG. 5 is a block diagram of an illustrative data recovery and remodulation device.

FIG. 5 is a block diagram of an illustrative DRR device 500 suitable for use in connectors 302, 303. (Connector 301 requires a DRR device having more than the number of lanes illustrated in FIG. 4.) It should be noted that cables complying with different portions of the Ethernet Standard may employ different numbers of data lanes as described in the standard and in various co-pending applications of the applicant.

DRR device 500 is a packaged integrated circuit chip having a first set of serializer/deserializer (SerDes) modules with contacts 501 for receiving and transmitting high-rate serial data streams across eight bidirectional lanes (e.g., the cable conductors 306), a second set of SerDes modules with contacts 502 for exchanging high-rate serial data streams across eight bidirectional lanes (e.g., the contacts of connector 302), and core logic 503 for implementing a channel communications protocol while buffering data in each direction. Also included are various supporting modules and contacts 504, 505, for functions such as power regulation and distribution, clock generation, digital input/output lines for control, and a JTAG module for built-in self testing. The chip designer can design the device by placing the predefined modular units for the serializers, deserializers, power, clock generator, I/O cells, and JTAG; and routing the interconnections between the modular units with a bit of supporting logic.

The deserializer modules, an example of which is shown in FIG. 6, receive the high-rate serial data streams and convert them to lower-rate parallelized data streams for on-chip handling. Deserializer module 600 receives an analog electrical signal (CH_IN) and supplies it to an optional amplifier 602 and thence to the input of a continuous time linear equalization (CTLE) filter 604. CTLE filter 602 provides analog filtering to shape the signal spectrum and minimize aliasing. A decision feedback equalizer (DFE) 606 performs analog-to-digital conversion, digital filtering to control leading inter-symbol interference (ISI), feedback filtering to control trailing ISI, and detection of each transmitted channel bit or symbol, thereby producing a demodulated digital data stream. A clock recovery (CR) circuit 608 extracts a clock signal from the filtered signal and/or the digital data stream and supplies it to DFE 606 to control sample and symbol detection timing. A serial-to-parallel circuit 610 groups the digital data stream bits or symbols into parallel blocks to enable subsequent on-chip operations to use lower clock rates. The symbols or data blocks are placed on the digital receive bus (RXD) for optional Forward Error Correction (FEC), Physical Coding Sublayer (PCS), and Media Access Control (MAC) sublayer processing as specified by relevant portions of the Ethernet Standard.

During a training phase, a filter adaptation circuit 609 measures an error between the input and output of a decision element in DFE 606, employing that error in accordance with well-known techniques from the literature on adaptive filtering to determine adjustments for the coefficients in CTLE filter 604 and various elements of DFE 606, and to determine whether convergence has been achieved. The adaptation circuit 609 adjusts the coefficient values and outputs locally generated information (LOCAL_INFO), which includes the transmit filter coefficient adjustments and the convergence status. Where the system supports the use of a backchannel, the LOCAL_INFO is supplied to a local serializer module 700 (FIG. 7) that communicates in the reverse direction on the data lane. The local transmitter communicates the transmit filter adjustments and the convergence status via the backchannel to the source of the CH_IN signal. In that vein, the received signal includes back-channel information from the source of the CH_IN signal. A packet information extractor 612 detects the back-channel information (BACK_INFO) and passes it to the local serializer module 700. Once convergence is achieved, deserializer module 600 is ready to begin normal operations.

After the optional FEC, PCS, MAC sublayer processing, the RXD data stream may be buffered before being subjected to further MAC, PCS, and FEC sublayer processing to ensure packet integrity and restore error correction code protection.

FIG. 7 shows a serializer module that receives blocks of either an original or processed data stream on the digital transmit data (TXD) bus for transmission to the source of the CHIN signal (FIG. 6). During normal operations, multiplexer 702 supplies blocks of channel bits or symbols received on the TXD bus to the parallel to serial (P2S) circuit 704. P2S circuit 704 converts the blocks into a serial data stream. A transmit filter 706, also called a pre-equalization filter, converts the digital data stream into an analog electrical signal with spectral shaping to combat channel degradation. Driver 708 amplifies the analog electrical signal to drive the channel output (CH_OUT) node.

During the training phase, multiplexer 702 obstructs information from the TXD bus, instead supplying P2S circuit 704 with training frames from a training controller 710. The training controller 710 generates the training frames based on the convergence status and transmit filter coefficient adjustments (LOCAL_INFO) received from the local deserializer module 600. That is, in addition to training patterns, the training frames may include backchannel information to be used by the remote end of the channel. Note that even after the local deserializer indicates filter convergence has occurred, the training controller 710 may prolong the training phase to coordinate training phase timing across lanes and along each link of the channel. The training frames include training sequences as specified by the relevant portions of the current Ethernet standard (IEEE Std 802.3).

The training controller 710 further accepts any back-channel information (BACK_INFO) extracted by the local deserializer module 600 from received training frames sent by the local end node (source of the CH_IN signal). The training controller applies the corresponding adjustments to the coefficients of transmit filter 706. Upon conclusion of the training phase, multiplexer 702 begins forwarding TXD blocks to the P2S circuit 704.

FIG. 8 shows part of a communication link architecture using the ISO/IEC Model for Open Systems Interconnection (See ISO/IEC 7498-1:1994.1) for communications over a physical medium such as the electrical conductors represented by channels 306. The interconnection reference model employs a hierarchy of layers with defined functions and interfaces to facilitate the design and implementation of compatible systems by different teams or vendors. While it is not a requirement, it is expected that the higher layers in the hierarchy will be implemented primarily by software or firmware operating on programmable processors while the lower layers will be implemented as application-specific hardware.

The Application Layer 802 is the uppermost layer in the model, and it represents the user applications or other software operating a server or other system that needs a facility for communicating messages or data. The Presentation Layer 804 provides such applications with a set of application programming interfaces (APIs) that provide formal syntax along with services for data transformations (e.g., compression), establishing communication sessions, selecting a connectionless communication mode, and performing negotiation to enable the application software to identify the available service options and select therefrom. The Session Layer 806 provides services for coordinating data exchange including: session synchronization, token management, full- or half-duplex mode implementation, and establishing, managing, and releasing a session connection. In the connectionless mode, the Session Layer may merely map between session addresses and transport addresses.

The Transport Layer 808 provides services for multiplexing, end-to-end sequence control, error detection, segmenting, blocking, concatenation, flow control on individual connections (including suspend/resume) and implementing end-to-end service quality specifications. The focus of the Transport Layer 808 is end-to-end performance/behavior. The Network Layer 810 provides a routing service, determining the links used to make the end-to-end connection and when necessary acting as a relay service to couple together such links. The Data link layer 812 serves as the interface to physical connections, providing delimiting, synchronization, sequence and flow control across the physical connection. It may also perform packet integrity verification to detect and optionally correct packet errors that occur across the physical connection. The Physical layer 814 provides the mechanical, electrical, functional, and procedural means to activate, maintain, and deactivate communication channels, and to use those channels for transmission of bits across the physical media.

The Data Link Layer 812 and Physical Layer 814 are subdivided and modified slightly by IEEE Std 802.3-2015, which provides a Media Access Control (MAC) Sublayer 816 in the Data Link Layer 812 to define the interface with the Physical Layer 814, including a frame structure and transfer syntax. Within the Physical Layer 814, the standard provides a variety of possible subdivisions such as the one illustrated, which includes a Physical Coding Sublayer (PCS) 818, a Forward Error Correction (FEC) Sublayer 820, a Physical Media Attachment (PMA) Sublayer 822, and a Physical Medium Dependent (PMD) Sublayer 824.

The PCS Sublayer 818 provides scrambling/descrambling, data encoding/decoding (with a transmission code that enables clock recovery and bit error detection), block and symbol redistribution, PCS alignment marker insertion/removal, and block-level lane synchronization and deskew. To enable bit error rate estimation by components of the Physical Layer 814, the PCS alignment markers typically include Bit-Interleaved-Parity (BIP) values derived from the preceding bits in the lane up to and including the preceding PCS alignment marker.

The FEC Sublayer 820 provides, e.g., Reed-Solomon coding/decoding that distributes data blocks with controlled redundancy across the lanes to enable error correction. In some embodiments (e.g., in accordance with Article 91 or proposed Article 134 for the IEEE Std 802.3), the FEC Sublayer 820 modifies the number of data lanes.

The PMA Sublayer 822 provides lane remapping, symbol encoding/decoding, framing, and octet/symbol synchronization. In some embodiments, the PMA Sublayer 822 co-opts portions of the PCS alignment markers to implement a hidden backchannel as described in co-owned U.S. Pat. No. 10,212,260 "SerDes architecture with a hidden backchannel protocol". The backchannel can be used for the previouslydescribed training information as well as to convey command and status info among the DRR devices in the cable connectors.

The PMD Sublayer 824 specifies the transceiver conversions between transmitted/received channel signals and the corresponding bit (or digital symbol) streams. Typically, the PMD Sublayer 824 implements a channel training phase and optionally an auto-negotiation phase before entering a normal operating phase. The auto-negotiation phase enables the end nodes to exchange information about their capabilities, and the training phase enables the end nodes to adapt both transmit-side and receive-side equalization filters in a fashion that combats the channel non-idealities. A port connector receptacle 826 is also shown as part of the PMD sublayer 824 to represent the physical network interface port.

Various contemplated embodiments of the SerDes modules implement the functionality of the PMD, PMA, and FEC Sublayers. See, e.g., co-owned U.S. application Ser. No. 16/793,746 "Parallel Channel Skew for Enhanced Error Correction", filed Feb. 18, 2020 and hereby incorporated herein by reference. More information regarding the operation of the sublayers, as well as the electrical and physical specifications of the connections to the communications medium (e.g., pin layouts, line impedances, signal voltages & timing), and the electrical and physical specifications for the communications medium itself (e.g., conductor arrangements in copper cable, limitations on attenuation, propagation delay, signal skew), can in many cases be found in the current Ethernet standard, and any such details should be considered to be well within the knowledge of those having ordinary skill in the art.

The enhanced cable of FIG. 3 may be an active ethernet cable having a DRR device in one or more of the connectors to implement at least some of the sublayer functionalities described above. FIG. 8 shows an illustrative non-redundant connector 301 having a plug that mates with network port receptacle 826. Non-redundant connector 301 includes a DRR device with a set of SerDes modules to implement the host facing PMD and PMA sublayers 830, and sets of SerDes modules implementing the PMD, PMA sublayers 840A, 840B for communicating with redundant connectors 302, 303 via conductors 306 (FIGS. 3-4). Optionally, the DRR device may further implement host-facing FEC, PCS, and MAC sublayers 832, as well as cable-facing FEC, PCS, and MAC sublayers 838A, 838B for respectively communicating with redundant connectors 302, 303. A set of first-in first-out (FIFO) buffers 834A buffer the bidirectional multi-lane data streams between the host facing sublayers 830-832 and the sublayers 838A-840A for communicating with the first redundant connector 302. A second set of FIFO buffers does the same between the host-facing sublayers 830-832 and sublayers 838B-840B for communicating with the second redundant connector 303.

The multi-lane data stream received by the host-facing sublayers 830-832 from the network node 102 is (after error correction and packet integrity checking by optional sublayers 832) broadcast to both FIFO buffer sets 834A, 834B for communication to both of the redundant connectors 302, 303. The buffered multi-lane data streams from each of the redundant connectors are provided from both FIFO buffer sets 834A, 834B to a multiplexer 836, which selects one of the two multi-lane data streams for communication to the host-facing PMD, PMA sublayers 830 (after packet checksum generation and error correction coding by optional sublayers 832).

Though communications from both FIFO buffer sets are provided to the multiplexer and communications to both FIFO buffer sets are provided from the host-facing sublayers, the multiplexer state enables only one complete communications link; if the multiplexer selects the multi-lane data stream from FIFO buffer set 834A, the communications link between connectors 301 and 302 is enabled. Otherwise, when FIFO buffer set 834B is selected, the communications link between connectors 301 and 303 is enabled.

Figure 9A:
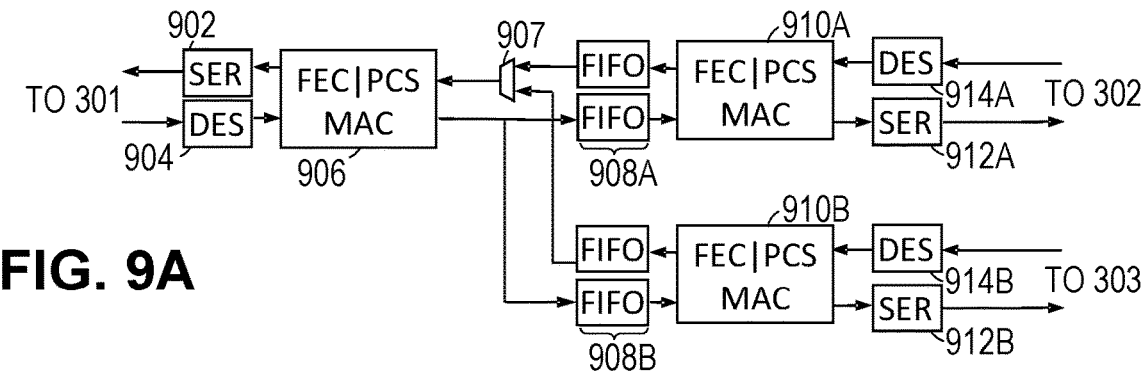
FIGS. 9A-9C show alternative multiplexing & broadcast data flows usable by an illustrative cable connector.
Figure 9B:
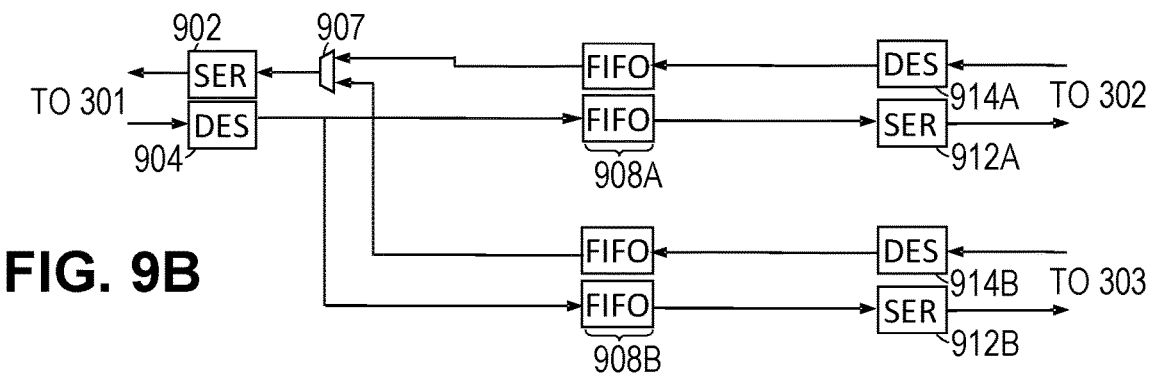
Figure 9C:
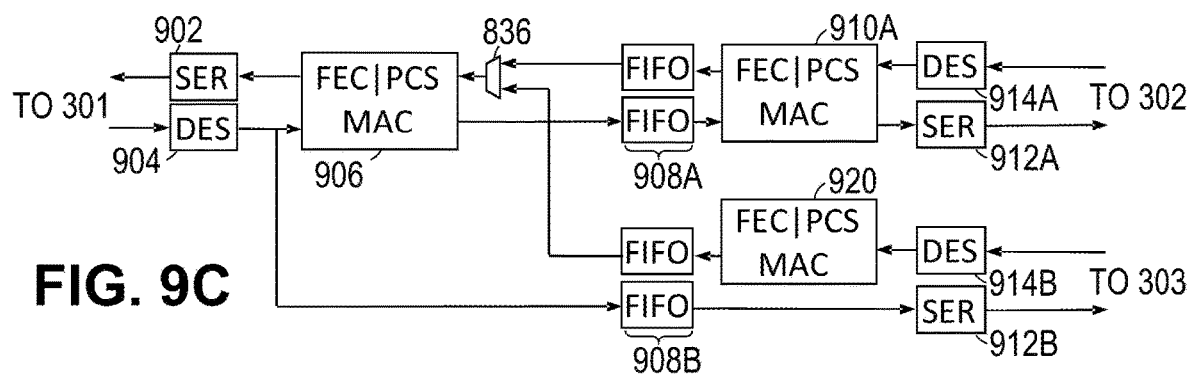

Multiple implementations of the illustrated broadcast/multiplex approach are possible for introducing redundancy into the cable design. FIGS. 9A-9C show some of the contemplated implementations, without explicitly representing the multiple lanes.

FIG. 9A represents the architecture of FIG. 8. A serializer module 902 and a deserializer module 904 connect to the contacts of the non-redundant connector 301. The serializer and deserializer modules implement the PMD, PMA protocol sublayers in accordance with the Ethernet Standard. For the deserializer, this would include equalization, symbol detection, serial to parallel conversion, and lane de-skewing. For the serializer, this would include parallel-to-serial conversion, symbol modulation, pre-equalization, and transmission.

The deserializer module provides the multi-lane data stream to a host facing FEC/PCS/MAC sublayer (FPM) module 906 for communication to the redundant connectors 302, 303. The host-facing FPM module 906 provides serializer 902 with a selected one of the multi-lane data streams from the redundant connectors 302, 303. The selecting is performed by a multiplexer 907. When multiplexer 907 selects the data stream from redundant connector 302, the FPM module 906 conveys data streams to and from redundant connector 302 via a set of FIFO buffers 908A, a cable-facing FPM module 910A, and SerDes modules 912A, 914A. When multiplexer 907 selects the data stream from redundant connector 303, FPM module 906 conveys data streams to and from redundant connector 303 via a set of FIFO buffers 908B, a cable facing FPM module 910B, and cable-facing SerDes modules 912B, 914B. The FPM modules implement the Forward Error Correction (FEC), Physical Coding Sublayer (PCS), and Media Access Control (MAC) sublayers of the Ethernet protocol, providing among other things symbol detection/decoding, correction of errors (for incoming data) and regeneration of the error correction code protection (for outgoing data), as well as packet integrity verification (for incoming data) and checksum generation (for outgoing data).

The multiplexer 907 selection enables a communications link between connectors 301, 302 when the data stream from FPM module 910A is selected, and enables a communications link between connectors 301, 303 when the data stream from FPM module 910B is selected. The data stream received via the non-redundant connector 301 is broadcast by FPM module 906 through both the redundant connectors 302, 303.

In the default state where both communication links are available, the multiplexer 907 selects the link via connector 302. Connector 301 is provided with the data stream received via connector 302, and the data stream received via connector 303 is discarded by multiplexer 907. The multiplexer state may be controlled by an internal register of the DRR device, which can be set by the DRR device if an error is detected internally or can be set by an external controller. For example, the nodes to which the connectors are coupled can instruct the DRR device to switch the multiplexer state. In addition, or alternatively, the FPM module 910A can detect symbol errors and packet errors and monitor an error rate to detect whether a fault is associated with any of the connectors.

The FPM modules 906, 910A, 910B are optional, and FIG. 9B shows an implementation in which they are omitted. Because error correction is omitted, this implementation may be termed a "retiming" implementation. The detection of communications link reliability and consequent selection between the redundant connectors is left to the devices to which the connectors are coupled.

FIG. 9C shows yet another implementation. In this implementation the multiplexer 836 is positioned to provide a selected data stream to the FPM module 906, as in the implementation of FIG. 8. The communications link between connectors 301, 302 includes the host-facing FPM module 906 and the cable-facing FPM module 910A, as described above with reference to FIGS. 8 and 9A. The data stream conveyed from connector 301 to connector 303 is merely retimed, bypassing the FPM modules. The data stream from connector 303 to connector 301 is processed by cable-facing FPM module 920, for error correction and packet integrity verification, and if selected by multiplexer 836, is processed by host-facing FPM module 906 for checksum and error correction code regeneration. The performance of the two links can be evaluated by FPM modules 910A, 920, and used by the DRR device to automatically control multiplexer 836. Other variations are also possible.

We note here that when the primary communications link between connectors 301, 302 is active (selected), it is possible for the secondary communications link between connectors 301, 303 to experience multiple outages without affecting the traffic on the primary link. If, due to a hardware or software failure, the primary link goes down, the data stream received via the non-redundant connector is still broadcast to the redundant connector 303, and any data received via connector 303 is conveyed to the multiplexer, which can select that data for transmission via connector 301. The DRR device or an external controller can detect the link failure and change the state of the multiplexer. The transition between states is fast, i.e., on the order of a few nanoseconds. The secondary communications link status remains stable during the transition.

Although the link status can generally tolerate a truncated packet or two such as might be caused by an unsynchronized transition of the multiplexer, the DRR device can readily arrange for a synchronized transition. The physical layer interface may monitor the packet header information, enabling a transition to begin after the end of a packet from the primary communications link, and to complete when a packet from the secondary communications link begins. An idle pattern may be used to maintain the link during the transition interval.

The transition may be associated with an error code or alert signal in the DRR devices internal registers, causing the DRR device to convey an alert message to a network management service, which can in turn alert appropriate service personnel. Because the secondary communications link is operable, the cable connection continues to function while service personnel have time to diagnose and address the cause of the primary communications link failure.

When the primary communications link becomes operable, that condition may be detected by the cable-facing PFM module 910A, and the DRR device can return the multiplexer to its original state to resume using the primary communications link. As before, the state transition is fast, on the order of a few nanoseconds.

FIG. 10 is a flow diagram of an illustrative reliability enhancement method which may be implemented by the DRR device. In block 1002, the DRR device defaults to an active state in which data received via the non-redundant connector 301 is copied to both the redundant connectors 302, 303, and the data transmitted from the non-redundant connector 301 is received via the primary redundant connector 302.

In block 1003, the DRR device checks for a fault, and if one is detected, the DRR device optionally sends an alert in block 1004 to initiate correction of the fault, and transitions to block 1006. Otherwise, the DRR device determines whether an instruction has been received to change the operating mode. If not, blocks 1003 and 1005 are repeated until a fault is detected or a mode change instruction is received, at which point, the DRR device transitions to block 1006.

In block 1006, the DRR device transitions to a backup state, in which data received via the non-redundant connector 301 is copied to both the redundant connectors 302, 303, and the data transmitted from the non-redundant connector 301 is received via the secondary redundant connector 303.

In block 1007, the DRR device checks for a fault in the backup path, and if one is detected, the DRR device optionally sends an alert in block 1008 before transitioning back to block 1002. Otherwise, the DRR device determines whether a mode change instruction has been received. If not, blocks 1007 and 1008 are repeated until a mode change instruction is received or a fault is detected, at which point the DRR device transitions back to block 1002.

The state transitions are expected to be fast, preserving the stability of each data path.

The foregoing embodiments are expected to facilitate practical and economic realization of path redundancies. Numerous alternative forms, equivalents, and modifications will become apparent to those skilled in the art once the above disclosure is fully appreciated. For example, the embodiments described above provide redundancy in the form of a single secondary redundant connector, but those of ordinary skill would recognize that the disclosed principles can be readily extended to provide multiple secondary redundant connectors to further increase the redundancy. It is intended that the claims be interpreted to embrace all such alternative forms, equivalents, and modifications that are encompassed in the scope of the appended claims.

What is claimed is:

1. A cable that comprises:
    a first connector connected to each of a second and third connectors, the first connector including a multiplexer that couples a data stream from a selectable one of the second and third connectors to an output of the first connector.

2. The cable of claim 1, further comprising a controller that monitors for a fault associated with the second connector and provides a selection input to the multiplexer based at least in part on whether the fault is detected.

3. The cable of claim 2, wherein as part of said monitoring, the controller compares a bit error rate, a symbol error rate, or a packet loss rate, to a predetermined threshold.

4. The cable of claim 1, wherein the first connector broadcasts a return data stream to each of the second and third connectors.

5. The cable of claim 4, wherein each of the data streams are retimed without error correction and regeneration of error correction code protection.

6. The cable of claim 4, wherein the first connector performs, for at least one of said data streams, error correction, packet integrity checking, and regeneration of error correction code protection.

7. A method comprising:
producing from an output of a cable's first connector a data stream from a currently selected one of the cable's multiple redundant connectors;
monitoring the data stream for a fault associated with the currently selected one of multiple redundant connectors; and
responsive to detecting said fault, producing from the output of the first connector a data stream from a different selected one of the multiple redundant connectors.

8. The method of claim 7, wherein said monitoring includes comparing a bit error rate, a symbol error rate, or a packet loss rate, to a predetermined threshold.

9. The method of claim 7, further comprising:
producing from an output of each of the multiple redundant connectors a return data stream from the first connector.

10. The method of claim 9, wherein the data stream from the currently selected one of the multiple redundant connectors and the return data stream form a primary communications link before detecting said fault, and wherein the data stream from a different selected one of the multiple redundant connectors and the return data stream form a secondary communications link after detecting said fault.

11. The method of claim 10, wherein said producing includes retiming the data streams of the primary and secondary communications links without error correction and regeneration of error correction code protection.

12. The method of claim 10, wherein said producing includes error correction, packet integrity checking, and regeneration of error correction code protection for at least the data streams of the primary communications link.

13. A network that comprises:
a network node having a first network port;
a switch having second and third network ports; and
a cable having first, second, and third connectors respectively coupled to the first, second, and third network ports, the cable configured to couple a data stream from a selectable one of the second and third connectors to the first network port.

14. The network of claim 13, wherein the switch directs a data stream to the network node via the second network port until a fault associated with the second network port is detected, and wherein upon detection of the fault the switch redirects the data stream to the third network port.

15. The network of claim 13, wherein the cable includes: a controller to monitor for a fault associated with the second connector and to control the selection between the second and third connectors based on detection of the fault.

16. The network of claim 15, wherein as part of said monitoring, the controller compares at least one of a bit error rate, a symbol error rate, and a packet loss rate, to a predetermined threshold.

17. The network of claim 13, wherein the first connector broadcasts a return data stream to each of the second and third connectors.

18. The network of claim 17, wherein each of the data streams are retimed without error correction and regeneration of error correction code protection.

19. The network of claim 17, wherein the first connector performs, for at least one of said data streams, error correction, packet integrity checking, and regeneration of error correction code protection.

20. A method comprising:
coupling a first network port of a network node to each of multiple network ports of a switch with a cable having a first connector connecting to the first network port and multiple redundant connectors each connecting to one of said multiple network ports;
conveying a data stream from the switch to the network node via a primary one of the multiple redundant connectors; and
redirecting the data stream from the switch to the network node via a secondary one of the multiple redundant connectors.

21. The method of claim 20, wherein said redirecting includes detecting a fault associated with the primary one of the multiple redundant connectors.

22. The method of claim 21, wherein said detecting a fault includes comparing a bit error rate, a symbol error rate, or a packet loss rate, to a predetermined threshold.

23. The method of claim 20, further comprising:
broadcasting a return data stream from the network node to the switch to each of the multiple redundant connectors.

24. The method of claim 23, wherein said conveying and broadcasting each include retiming of the data streams without error correction and regeneration of error correction code protection.

25. The method of claim 23, wherein said conveying and broadcasting each include error correction of the data streams, packet integrity checking, and regeneration of error correction code protection.

* * * * *